Sept. 10, 1968
F. O. CARTA ET AL
3,400,912
HIGH PERFORMANCE PINNED ROOT ROTOR
Filed Aug. 16, 1967
2 Sheets-Sheet 1
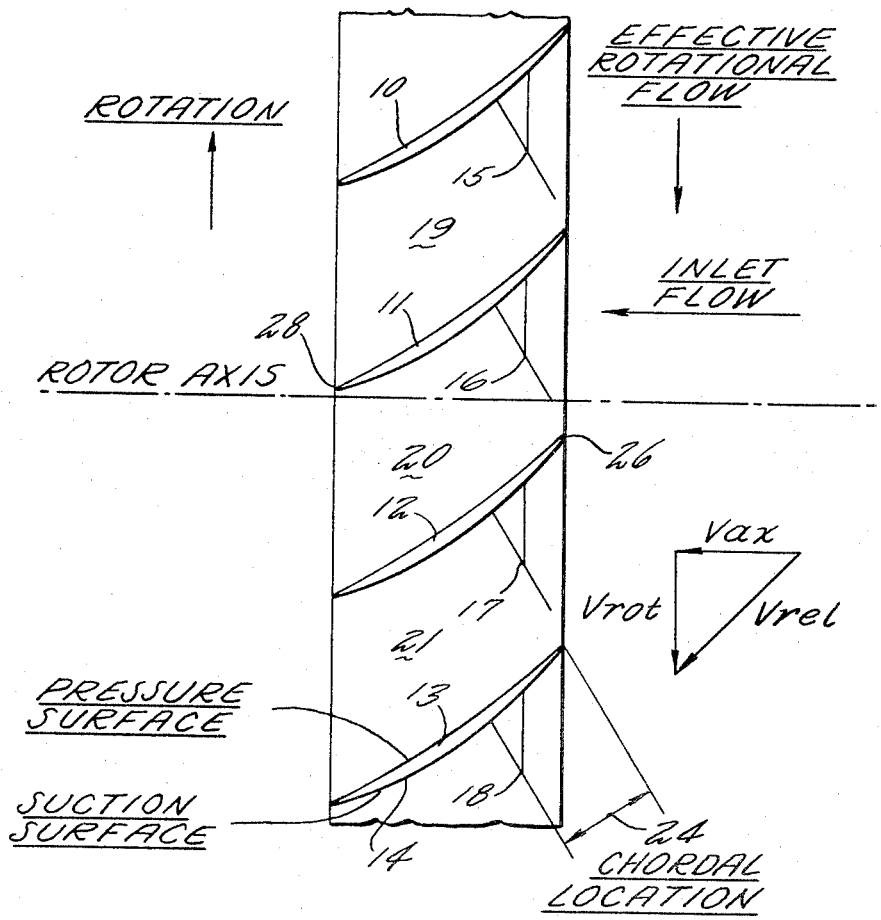
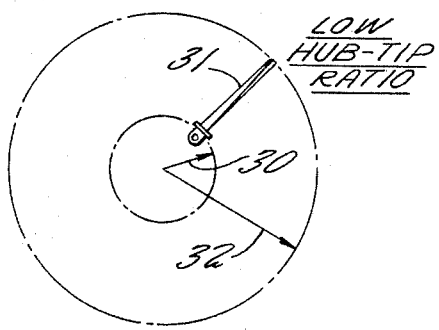
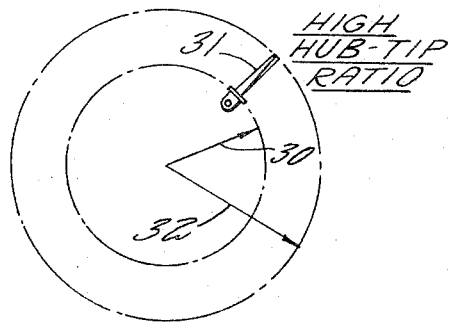
INVENTORS
FRANKLIN O. CARTA
HANS STARGARDTER
BY Melvin Pearson Williams
ATTORNEY

RADIALLY INWARD

United States Patent Office 3,400,912
Patented Sept. 10, 1968

3,400,912
HIGH PERFORMANCE PINNED ROOT ROTOR
Franklin O. Carta, West Hartford, and Hans Stargardter, Bloomfield, Conn., assignors to United Aircraft Corporation, East Hartford, Conn., a corporation of Delaware
Filed Aug. 16, 1967, Ser. No. 660,945
9 Claims. (Cl. 253—77)

ABSTRACT OF THE DISCLOSURE

A rotor of a turbofan engine has blades disposed thereon by pinned roots which include, singly or in various combinations, any of the following differences in mechanical configuration of one blade from the mechanical configuration of the next adjacent blade on the rotor: radial distance of pin from axis of rotor; size of pin; clearance between pin and either the blade hole or the rotor hole or both; size of blade hole or size of rotor hole.

Background of the invention

*Field of invention.*—This invention relates to rotary blade machinery, and more particularly to improvements in machinery in which blades are disposed on a rotor by means of pinned roots.

*Description of the prior art.*—A well known form of rotary blade machinery is the axial flow compressor such as is used in jet-type aircraft engines. The well known turbofan engine employs a bladed fan as well as a bladed compressor.

Resonant frequencies in rotating systems are, of course, undesirable; and in jet engine design, much effort is expended in the elimination thereof. Many rotors in current jet engines have relatively rigid blade root attachments (such as the well known "fir tree" or "dove tail") which provide sufficient stiffness so that a natural bending frequency of a rotor blade is initially high at zero rpm and varies parabolically to as much as twice this value at the design speed of the engine. This type of blade (fixed root), and its attachment to a rotor must both be carefully designed to avoid having the natural frequency of the blade equal to the engine rotational speed or an integral order of (two or three, or more times) the engine rotational speed. However, the coincidence of higher integral order frequencies with engine rotational speed is unavoidable. Although excitation from higher integral orders is less severe than from the primary order, and although fixed-root rotors are designed to have maximum vibration at rotational speeds which fall well above or below any operating rotational speeds (such as taxiing, take-off, cruising, etc.), there are occasions where the higher order excitations may nonetheless be intolerable.

In order to overcome the problems relating to blade excitations resulting from resonances at integral orders of engine rotational speed, an alternative design has been provided in which a round dowel, or pin, is passed through the blade root and the rotor in order to dispose blades on the rotor. This type of attachment is referred to herein as a pinned-root attachment; it is sometimes referred to as a free-pin attachment. Since centrifugal force acting on the blade at high speeds induces a restoring moment about the pin, the bending frequency varies directly with rpm. The pinned-root attachment has a zero natural bending frequency at zero rpm. Thus, the pinned-root attachment can yield a frequency variation with rotor speed that does not intersect any of the integral order lines; in other words, the blade will not resonate at a frequency which is an integral order of the engine rotational speed. It is well known that such blades result in a rotor assembly which has a higher weight than fixed-root rooters such as the well known fir-tree type of root. Therefore, such rooters have not found acceptance for the bulk of applications, but rather have heretofore been used primarily where the vibration characteristics of such rotors are absolutely required in preference to the vibration characteristics of a fixed-root rotor.

In addition, vibrations of the self-induced type have been found to exist in high performance engines operating with highly-loaded rotors. Therefore, the pinned-root blade has not been utilized to any great extent.

Summary of the invention

An object of the invention is to provide a pinned-root rotary blade machine capable of advanced aerodynamic performance.

Another object is to provide a pinned-root rotary blade machine having minimal self-induced vibrations.

According to the present invention, the position on the rotor or the detailed geometry of root-pin structure is varied between adjacent blades on the rotor of a rotary blade machine so as to substantially lessen the effects of pressure and velocity variations induced by equilibrium disturbance at one blade which may propagate to an adjacent blade. In further accord with one embodiment of the present invention, the nominal radial position of the root pin on one blade is made to be different from the nominal radial position of the root pin on adjacent blades. In accordance with further embodiments of the present invention, the clearance between the root pin and the pin hole on either or both of the rotor and the blade is made to be different for adjacent blades. According to still another embodiment of the present invention, the size of the root pin, or the size of either the blade or rotor holes for the pin, is different in adjacent blades. In still further accord with an embodiment of the present invention, various combinations of the differences in position or geometric details of the root-pin structure of adjacent blades may be employed in a variety of combinations.

One exemplary embodiment of the present invention employs pinned-root blades disposed on a rotor having root pin holes positioned at two or three different radial distances on the rotor, so that blades appear in groups of two or three, each blade in the group being pinned at a different radial distance on the rotor, each group being like the others. In addition, the size of the pin for blades disposed at one radial distance is different from the size of the pin for blades disposed at a different radial distance, and concomitantly, the clearance between the pin and the hole for each blade differs from the adjacent blades at another radial distance. This not only achieves the objects of the invention, but permits ready assembly by having pins identified in terms of the radial distance at which they are to be disposed.

The foregoing and other objects, features and advantages of the present invention will become more apparent in the light of the following detailed description of preferred embodiments thereof as illustrated in the accompanying drawing.

Brief description of the drawing

FIG. 1 is a simplified semipictorial end view of pinned-root rotor blades illustrating aerodynamic forces acting thereon;

FIGS. 2 and 3 are pictorial illustrations of hub-tip ratio;

Description of the preferred embodiment

Figure 4:
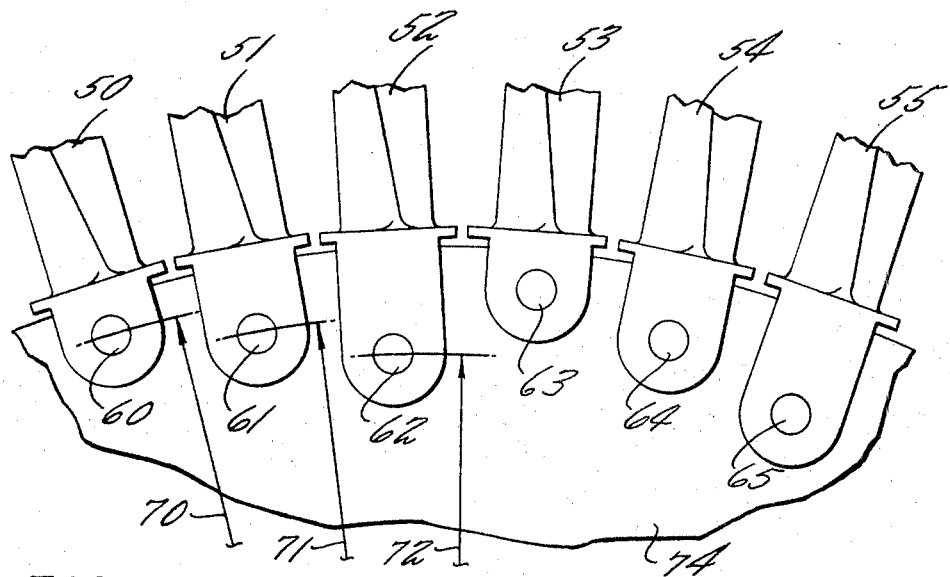
FIG. 4 is a fragmentary side elevation of a plurality of pinned-blade roots in which the pins are on staggered hole circles, and the pin diameters and clearance vary according to the hole circles, in accordance with one embodiment of the present invention.

With the advent of larger and higher speed aircraft engines, the need for turbofan engines having much higher thrust has resulted in new problems, which have heretofore been thought to render pinned-root blades unsuitable for use in such turbofan engines.

It has been discovered that fatigue in pinned-blade rotors of advanced design is due to the presence of a severe bending flutter at a frequency which is not an integral order of the rotational speed of the engine. As is known in the prior art, a bending buffet type of bending response occurs at nonintegral orders of engine speed, and at the first natural bending frequency of the blade, and is random with respect to time. It usually occurs at high speed under high blade loading conditions. It has further been discovered that blade bending vibrations in advanced engine designs may also include an essentially sinusoidal self-excited vibration of a very large, constant amplitude. Thus, a well-ordered blade, self-excited vibration of the blading at amplitude with all blades in the stage oscillating at precisely the same frequency differs from the bending buffet known to the prior art, and a bending frequency which is not an integral order of the rotational engine speed differs from the integral order resonance known to the prior art.

This invention is predicated on the concept that bending fatigue failure caused by severe bending flutter having a large, constant amplitude, sinusoidal response at a frequency which is nonintegral with rotor speed is a coherent bending flutter, involving a plurality of blades, which is associated with an aerodynamic interaction between oscillating blades, which action is reinforced by the blade-to-blade frequency coherence and by the existence of an interblade phase angle that permits the propagation of energy along the blade row. This is further believed to be an aeroelastic instability resulting from the interaction of various aerodynamic forces with the physical dynamics of the pinned-root blades. A theory, not yet proven in all respects, which is believed to explain the problems of pinned-root rotors of advanced aerodynamic design, is best understood in conjunction with FIGS. 1–3. For instance, the velocity of air flow through the compressor of the engine is a resultant vector flow $V{rel}$, FIG. 1) including an axial component ($V{ax}$), which results from the influx of air into the front of the engine, and the relative rotational velocity of air ($V{rot}$), which results from the rotation of the machine. As the velocity of air becomes higher and higher with more advanced aerodynamic concepts, a critical Mach number condition is attained on the suction surface of the compressor blades 10–13. At a sufficiently high Mach number, acceleration of the air mass along the suction surface 14 of the blade leads to a critical Mach number condition in which a shock wave 15–18 stands off from each blade leading in the direction of an adjacent blade. This shock wave may extend entirely to an adjacent blade, or, as shown in FIG. 1, may merely span part of the passage 19–21 between adjacent blades; in either case, the shock wave exerts a dominant influence on the air flow and pressure within the passage between two adjacent blades. This critical Mach number ranges between .6 and .9, depending upon the local curvature of the suction surface 14 of the blade, as is known in the art. At equilibrium, the shock will have a preferred chordal location 24: the position of the shock wave will be at a position which is a given fraction of distance along the chord between the leading edge 26 and trailing edge 28 of the blade. The chordal location of the shock depends on the pressure distribution, and conversely, the pressure distribution depends on the chordal location of the shock wave. An interaction between these two interdependent parameters may take place such that, if the blade is disturbed from its equilibrium position, the passage pressure will change and hence the shock position will change. This changes the pressure ditribution in neighboring or adjacent blades. These blades in turn respond by deflecting and changing the pressure distribution in additional passages, thereby cascading or snowballing this effect. Thus, when there is any disturbance in equilibrium in blade 11, it will change the pressure and the position of the shock waves 15, 16 within the passages 19 and 20 between blades 10, 11 and between blades 11, 12, so that the blades 10 and 12 are disturbed from their equilibrium positions. They, in turn, will transfer a pressure change into a subsequent passage in each direction, such as passage 21 between blade 12 and blade 13, and disturb blade 13 from its equilibrium position, and so forth, thereby resulting in the snowballing or cascading effect described hereinabove.

It is further believed that a combination of blade inlet relative Mach number (the Mach number of the air flow at $V{rel}$) and hub-tip ratio causes, or contributes to the occurrence of an instability. This may result from a relative Mach number greater than the local critical Mach number for the stage, combined with a high hub-tip ratio, or even with low hub-tip ratios when the relative Mach number is sufficiently high so as to exceed the local critical Mach number uniformly along a substantial length of the blade.

As is known in the art, and as depicted in FIGS. 2 and 3, hub-tip ratio is the comparison of the distance of the hub 30 of a blade 31 compared with the distance from the axis of the rotor to the tip 32 of the blade. FIG. 2 illustrates a low hub-tip ratio, whereas FIG. 3 illustrates a high hub-tip ratio.

If the hub-tip ratio is high enough, a relatively constant Mach number may exist over the span of the blade (from the hub to the tip). On the other hand, if a low hub-tip ratio is in existence, then the Mach number variation over the span may be quite large. If the Mach number distribution over the span is nearly constant, then once the overall Mach number is high enough, a large portion of the span will then be at a critical Mach number. This critical Mach number will extend over a substantial portion of the blade rather than merely affecting one local region of it. Therefore, the effects resulting from critical Mach number could be a greater proportion of the total aerodynamic interactions acting upon the blade and so the tendency toward the cascading disturbance will be markedly increased compared with low hub-tip ratio blades. In a rotor having a low hub-tip ratio, the variation in speed is sufficiently great that the radially inward end of the blade may, for example, be associated with a Mach number of .4, whereas the tip of the blade may, for example, be associated with a Mach number of .9, and thus only the tip region of the blade would be within the range of the critical Mach number (.6–.9) so as to be under any substantial influence of the effects described hereinbefore.

The new aeroelastic instability described above occurs in the presence of a blade response at precisely the same frequency on all blades in the cascade, and results in a coherent bending flutter which has been found to be the nature of the vibrations in pinned-blade rotors of advanced aerodynamic design. An interruption between any two adjacet blades will break up the continuity of this self-excited system and will retard or inhibit the onset of the instability.

In order to obviate these problems, breaking up of the cascade path of the interdependent effect of the phenomena described above from one blade to the next is achieved by detuning, so that the effects are random rather than being in the nature of a coherent wave which propagates completely around the rotor. When the frequencies are the same, energy is readily transferred from one blade to its neighbor. However, when the blades have different natural frequencies, then the energy transferred from one blade to the next will be less effective because it is not at the resonant frequency of the blade and it takes more energy to cause the disruption of the aerodynamic balance or equilibrium.

An analysis of blades which are disposed on a rotor by a free pin, referred to herein as pinned-root blades, is given in a paper entitled, "Some Vibration Characteristics of Pin-Fixed Compressor Blades," by J. I. Goatham and G. T. Smailes, which was contributed for presentation at the winter annual meeting of the American Society of Mechanical Engineers, November-December 1966, at New York, N.Y., Paper No. 66–WA/GT–4. In said paper, an extensive discussion is given of the dynamics of compressors having pinned-root blades, including vibration, bending-stress distribution, natural frequencies, and expected positions of failure. Therefore, a theoretical dynamic and mathematical analysis of root pin geometry is not given herein, but rather references made to said article which is incorporated herein by reference.

Figure 5:
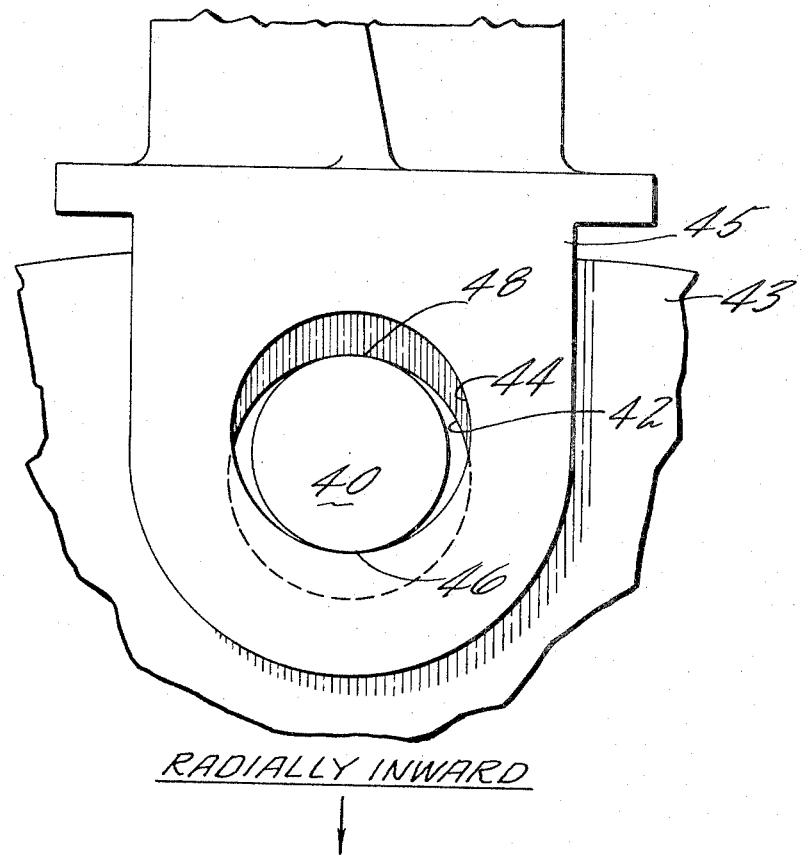
FIG. 5 is a fragmentary side elevation view of a pinned-root blade illustrating other embodiments of the invention.

Briefly described, a pinned-root blade, as illustrated in FIG. 5, operates mainly as a rigid pendulum which is free to rotate, within rather narrow limits, about the pin 40 with which it is disposed to a rotor. The hole 42 in the rotor 43 and the hole 44 in the blade 45, through which the securing pin passes, each have a larger diameter than the pin itself so as to permit rolling of the parts rather than frictional sliding or slipping.

Referring to FIG. 5, as is apparent from the aforementioned article, the amount of rolling which may take place is a function of the geometry of the pin 40, the rotor-hole 42 and the blade-hole 44. When the blade 45 is disturbed so it tends to be rotated about the pin 40, the radially inward surface 46 of the blade-hole 44 being pressed against an adjacent surface of the pin 40 by a very high centrifugal force, it tends to cause the pin 40 to rotate with it. This is much the same as rolling a heavy plank on a log. Since the pin 40 rotates with the surface 46 of the blade 45, it also tends to rotate on a surface 48 of the rotor hole 42. The net effect is to cause the pin 40 to actually roll along the surface of the rotor hole 42 radially inwardly so that the blade 45 not only tilts but actually is brought radially inwardly as a result of tilting; the centrifugal force acting on the blade in opposition to this radial inward movement is what causes the blade to have a stiffness, the mathematical relationship of which is given in the aforementioned article.

Assuming the blade 45 to be disturbed in such a fashion that it rotates clockwise as seen in FIG. 5, the contact point 46 on the blade-hole 44 will move from right to left as seen in FIG. 5, thereby causing the pin 40 to rotate counterclockwise. The counterclockwise rotation of the pin 40 will cause the pin to move downwardly in FIG. 5 along the left side of the rotor-hole 42 thereby causing the center of rotation of the blade 45 to move slightly to the left and downwardly in FIG. 5. This action may be readily verified by imagining the surfaces 46 and 48 to be linear, the surface 46 being some movable object being rolled over a roller (pin 40) with respect to a reference plane (surface 48).

It is thus apparent that if the pin 40 were much smaller in diameter than both the rotor and the blade-holes 42, 44, a modest amount of translation of the blade 45 will result from an angular displacement of a given amount. On the other hand, if the pin diameter 40 is as large as that of the holes 42, 44, (minus some small amount of clearance which will permit the rolling action described hereinbefore) then hardly any translation of the blade 45 to either the right or the left will take place as a result of rotation of the blade 45. Similarly, the rolling action will be different if the size of the holes 42, 44 are not the same, and moreover if the diameter of the rotor-hole 42 were extremely large relative to the diameters of the pin and the blade-hole 44, a great deal of translation of the blade 45 would occur as a result of rotating the blade slightly. Contrarywise, if the blade hole diameter 44 were much larger than the pin diameter 40, and the rotor hole diameter 42 were only slightly larger than the pin diameter 40, then a great deal of the rotation of the blade 45 would take place with only a slight translation of a center of rotation of the blade resulting therefrom.

As illustrated in FIG. 4, a plurality of blades 50–55 may be mounted with pins 60–65 at different radial distances 70–72 on the rotor. As described in the aforementioned article, the different radial distance of the mass of the blade from the center of rotation of the rotor 74 will result in a different natural stiffness for the blade. This is easily understood since a displacement of a given amount at the tip of the blade will cause fewer degrees of rotation for a blade having a longer arc (such as blades 52 and 55) than would be required for blades of a shorter arc (such as blades 50 and 53). With fewer degrees of rotation of the blade as a result of a given disturbance, there will be a lesser tendency for a radial displacement of the blade (as described hereinbefore with respect to FIG. 5). The frequency of the blade is also inversely proportional to the square root of the distance between the axis of the rotor and the center of gravity of the blade. The shorter blade will, therefore, have a higher natural frequency as a result of both size and pin geometry. In addition to having the pins 60–65 mounted at different radial distances (70–72) on the rotor 74, the pins 60–65 may have corresponding or random sizes. For instance, if the pins 60, 63 are smallest, and the pins 62, 65 are larger than the pins 61, 64, then the pin size will also tend to cause frequencies of the blades 50, 53 to be lower than blades 51, 54 which in turn would be lower than that for blades 52, 55. Thus, both the radial distance (70–72) and the pin size would both tend to cause a similar effect in the relationship of the natural frequencies of the blades 50–55. Any combination of pin and hole size, together with different radial distances, as illustrated in FIG. 4, may be used. A preferred embodiment of the invention, however, includes a given pin and hole geometry for each radial distance (70, 71, 72), the root geometry being different for each of the radial distances. In addition, color coding of pins may be utilized so as to facilitate foolproof assembly thereby assuring that correct pins will be placed at each radial distance. Of course, blades may be mounted on the rotor 74 at only two different radii (such as 70, 71), so that every other blade is on the same radius, with alternate blades on a different radius.

TABLE OF VARIANTS

|  | Variation in radial distance (70–72) | Variation in pin size 40 | Variation in rotor hole 42 | Variation in blade hole 44 | Variation in pin-rotor clearance 40, 42 | Variation in pin-blade clearance 40, 44 |
|---|---|---|---|---|---|---|
| 1 |  | X |  |  | X | X |
| 2 |  | X | X |  | X | X |
| 3 |  | X | X |  |  | X |
| 4 |  | X |  | X | X | X |
| 5 |  | X |  | X | X |  |
| 6 |  |  | X |  | X |  |
| 7 |  |  |  |  |  |  |
| 8 |  |  | X | X |  | X |
| 9 |  |  | X | X |  | X |
| 10 |  | X | X | X | X |  |
| 11 |  | X | X | X |  | X |
| 12 |  | X | X | X | X | X |
| 13 | X | X |  |  | X | X |
| 14–23 | X |  | Same as 2–11 hereinabove | | | |
| 24 | X | X | X | X | X | X |

The various combinations of radial distances, (70–72) size of blade hole 44, size of rotor hole 42, diameter of the pin 40, and clearance between the pin 40, the blade hole 44 and the rotor hole 42 is given in the Table of Variants, hereinabove, in which "variation" means: difference between two adjacent blades, or between three blades in a row, or between a series of N blades, where N can be any reasonable number. In other words, the Table of Variants illustrates combinations of variations which may be made between blades so as to cause different natural frequencies in adjacent blades or a series of blades, thereby to break up the cascading of aerodynamic effects as described hereinbefore.

As a typical example, consider an aircraft engine having a high thrust which includes a second stage fan with blades under a foot long, using a rotor with each hole having a diameter which is equal to 1.09 the diameter of the pins (a 9% clearance), all pins and holes being nearly identical, and having roughly half-inch diameters operating below full speed: a coherent bending flutter of 20,000 to 30,000 p.s.i. variation can result. By increasing the pin diameter by about 3% or 4% in every other blade, no significant bending flutter occurs at any speed, even in an over-speed condition. It has been determined that a suitable difference in gross resonant frequency of adjacent blades is 5% or more, and this difference can be achieved with 3%–20% variation in geometry, singly or in combination, as shown in the Table of Variants, hereinbefore.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which we claim as new and desire to secure by Letters Patent of the United States is:

1. In a pinned-root rotary blade machine comprising:
  a rotor;
  a plurality of blades disposed on said rotor by pins passed through holes in the blades and in the rotor, said pins having sufficient clearance between the holes in the blades and in the rotor so as to permit rolling between the pin and the holes, the improvement comprising:
  each of said plurality of blades varying in its characteristics from a blade adjacent thereto in at least one characteristic chosen from the group of characteristic variations comprising: variation in the radial distance from the axis of said rotor of adjacent ones of said pins; variation in the size of adjacent ones of said pins; variation in the size of adjacent holes in said rotor; variation in the size of the hole in adjacent ones of said blades; variation in the amount of pin-rotor clearance of adjacent ones of said pins; variation in the amount of pin-blade clearance of adjacent ones of said blades.

2. The rotary blade machine according to claim 1 wherein said plurality of blades are arranged in a plurality of groups, the blades of each group being interspersed with the blades of at least one additional group, the blades of each group varying in its characteristics from the blades in at least one additional group by at least one of the variations and characteristics set forth in said group of characteristic variations.

3. In a pinned-root rotary blade machine comprising:
  a rotor having a plurality of holes disposed adjacent the periphery thereof;
  a plurality of blades disposed on said rotor, each of said blades having a root with holes therein, said blades being disposed on said rotor by pins passing through the holes in each blade and through holes in said rotor, the improvement which comprises:
  each of said holes on said rotor being at a different radial distance on said rotor from a hole adjacent thereto.

4. In a pinned-root rotary blade machine of the type having a plurality of blades disposed about the periphery of the rotor by pines passing through holes in the roots of the blades and through holes in the rotor, the improvement which comprises:
  said pins, blade holes, and rotor holes having suitable diameters so that clearance between a pin and at least one of the holes for each blade is different from the clearance between the pin and at least one of the holes for a blade adjacent thereto on said rotor.

5. In a pinned-root rotary blade machine of the type having a plurality of blades disposed about the periphery thereof by pins passing through holes in the roots thereof and corresponding holes disposed adjacent the periphery of said rotor, the improvement which comprises:
  the pin for each blade on said rotor having a different diameter than the pin for a blade adjacent thereto on said rotor.

6. In a pinned-root rotary blade machine comprising:
  a rotor;
  a plurality of blades disposed on said rotor by pins passed through holes in the blades and in the rotor, said pins having sufficient clearance between the holes in the blades and in the rotor so as to permit rolling between the pin and the holes, the improvement comprising:
  each of said plurality of blades varying in its characteristics from a blade adjacent thereto in at least one characteristic taken from the group of characteristic variations set forth in the following table:

TABLE OF VARIANTS

| | Variation in radial distance (70–72) | Variation in pin size 40 | Variation in rotor hole 42 | Variation in blade hole 44 | Variation in pin-rotor clearance 40, 42 | Variation in pin-blade clearance 40, 44 |
|---|---|---|---|---|---|---|
| 1 | | X | | | X | X |
| 2 | | X | X | | | X |
| 3 | | X | X | | | X |
| 4 | | X | | X | | X |
| 5 | | X | | X | X | |
| 6 | | | X | | | X |
| 7 | | | | X | | X |
| 8 | | | X | X | X | |
| 9 | X | | X | X | | |
| 10 | X | X | X | | X | |
| 11 | X | X | X | | | X |
| 12 | X | X | X | X | X | X |

7. The rotary blade machine according to claim 6 wherein at least one of the holes in said rotor is disposed at a different radial distance from the axis of said rotor than a hole adjacent thereto on said rotor.

8. The rotary blade machine according to claim 7 wherein said plurality of blades are arranged in a plurality of groups, the blades of each group being interspersed with the blades of at least one additional group, the blades of each group being disposed at holes on said rotor which are at a different radial distance from the axis of said rotor than the holes on said rotor relating to each other group.

9. The rotary blade machine according to claim 6 wherein said plurality of blades are arranged in a plurality of groups, the blades of each group being interspersed with the blades of at least one additional group, the blades of each group varying in its characteristics from the blades in at least one additional group by at least one of the variations set forth in said table.

References Cited

UNITED STATES PATENTS

| | | |
|---|---|---|
| 2,381,459 | 8/1945 | Merrick. |
| 2,928,652 | 3/1960 | Shapiro et al. |
| 2,944,787 | 7/1960 | Gingras. |
| 2,990,156 | 6/1961 | Marshall et. al. |
| 3,039,739 | 6/1962 | Leland. |

FOREIGN PATENTS 621,315    4/1949    Great Britain.

EVERETTE A. POWELL, JR. *Primary Examiner.*